United States Patent
Lee et al.

(10) Patent No.: US 8,107,371 B2
(45) Date of Patent: Jan. 31, 2012

(54) APPARATUS AND METHOD FOR PROVIDING QOS OF AV STREAMS

(75) Inventors: Hyeon-jae Lee, Hwaseong-si (KR); Jong-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1270 days.

(21) Appl. No.: 11/452,939

(22) Filed: Jun. 15, 2006

(65) Prior Publication Data

US 2006/0285013 A1    Dec. 21, 2006

(30) Foreign Application Priority Data

Jun. 16, 2005    (KR) .................. 10-2005-0052056

(51) Int. Cl.
  *H04L 12/28* (2006.01)
(52) U.S. Cl. ...................... 370/230.1; 370/431
(58) Field of Classification Search .......... 370/229–235, 370/252, 431, 445, 447, 448
  See application file for complete search history.

(56) References Cited

U.S. PATENT DOCUMENTS

| | | | |
|---|---|---|---|
| 6,452,915 B1 * | 9/2002 | Jorgensen | 370/338 |
| 6,643,256 B1 * | 11/2003 | Shimojo et al. | 370/229 |
| 6,717,912 B1 * | 4/2004 | Lemyre et al. | 370/230 |
| 6,996,061 B2 * | 2/2006 | Yang et al. | 370/233 |
| 7,486,686 B2 * | 2/2009 | Brandt et al. | 370/412 |
| 2003/0007724 A1 | 1/2003 | Gummalla et al. | |
| 2006/0242313 A1 * | 10/2006 | Le et al. | 709/230 |
| 2007/0047586 A1 * | 3/2007 | Tieman et al. | 370/486 |

FOREIGN PATENT DOCUMENTS

| | | |
|---|---|---|
| JP | 2002-261766 A | 9/2002 |
| JP | 2004-104427 A | 4/2004 |
| KR | 10-2004-0080367 A | 9/2004 |
| KR | 10-2005-0035294 A | 4/2005 |

* cited by examiner

*Primary Examiner* — Aung S Moe
*Assistant Examiner* — Kerri Rose
(74) *Attorney, Agent, or Firm* — Sughrue Mion, PLLC (57) ABSTRACT

An apparatus and method for providing the QoS of AV streams is disclosed, in which a period for processing AV streams to provide the QoS of the AV streams is separately assigned at a predetermined time, and a plurality of AV streams are simultaneously processed. The apparatus includes a determination unit that identifies the type of input data, a TDMA scheduler that assigns time division periods for processing the AV streams and general data during a predetermined recurring time period in accordance with the identification result, a buffer that stores the AV streams and the general data in memory areas corresponding to the assigned time division periods, and an output port that extracts and outputs the AV streams and the general data stored in the buffer in a FIFO manner.

15 Claims, 5 Drawing Sheets

APPARATUS AND METHOD FOR PROVIDING QOS OF AV STREAMS

CROSS-REFERENCE TO RELATED APPLICATION

This application claims priority from Korean Patent Application No. 10-2005-0052056 filed on Jun. 16, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to providing a quality of service (QoS) of audio and video (AV) streams, and more particularly, to providing a QoS of AV streams, in which a period for processing AV streams is separately assigned at a predetermined time in order to process data to provide the QoS, and a plurality of AV streams are simultaneously processed.

2. Description of the Related Art

A carrier sense multiple access with collision detection (hereinafter, referred to as "CSMA/CD") algorithm is an Ethernet transmission protocol that has been standardized in the IEEE 802.3 standard. According to the CSMA/CD, each of the medium access units (MAUs) connected to Ethernet, monitors whether the line they are commonly connected to is in use, and transmits data when the line is not in use.

If one MAU starts data transmission when another MAU is transmitting data, a collision occurs. Thus, this data is discarded, and the MAU of the receiving party requests that the MAU of the transmitting party retransmit the data. Each of the MAUs waits for a certain time period and retransmits the data a predetermined number of times until data transmission is successfully completed.

A hub or a router may be used to relay data.

At present, IEEE 802.3 Ethernet is the most widely used network technology. IEEE 802.3 Ethernet uses the aforementioned CSMA/CD algorithm as a medium access control (MAC) layer protocol. This is to make the MAC structure as concise as possible. The MAC layer processes traffic in a best effort mode that depends on free competition of traffic when assigning bandwidth.

The performance of such Ethernet improves as switching routers improve. In other words, a half-duplex communication mode, in which competition between channels is made in a related art hub or repeater has been changed to a full-duplex communication mode by the switching router. Thus, each host connected to the router uses all the bandwidth assigned to a port of each channel.

For reference, the switching router is referred to as a layer 2 switch or a wire-speed router Ethernet switch. In the present invention, the switching router is referred to as a switch.

Figure 1:
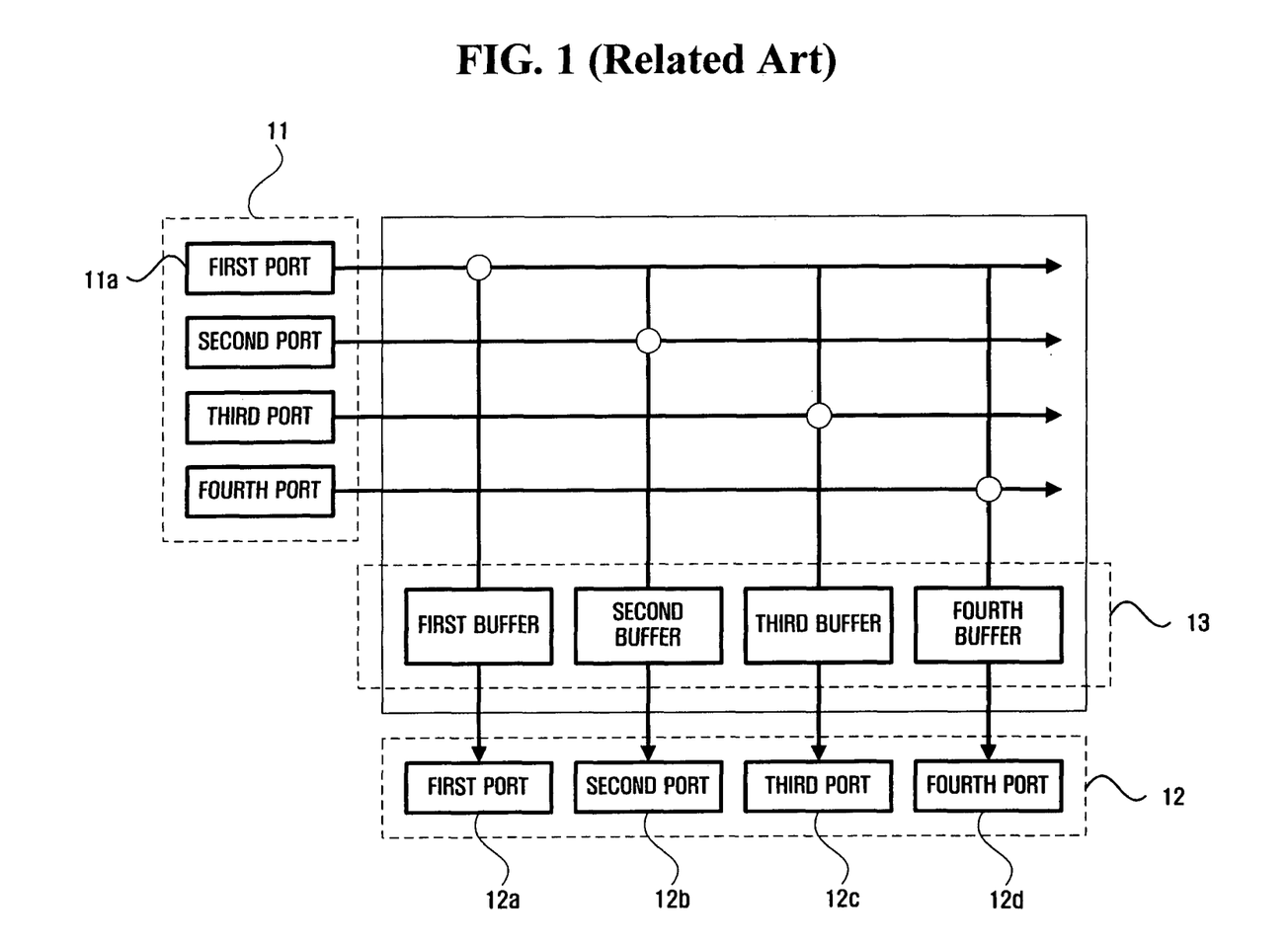
FIG. 1 is a conceptual view illustrating the construction of a related art switching hub.

FIG. 1 is a conceptual view illustrating the construction of a related art switching hub. Referring to FIG. 1, the related art switching router includes an input port 11, an output port 12, and a buffer 13.

A port that serves to input and output data, as shown in FIG. 1, is divided into input ports 11 and an output ports 12. That is, the port performs input or output functions.

In FIG. 1, a four-port switching router is shown. Data input to each input port 11 is output through a predetermined output port 12. At this time, since the port performs one of input and output functions, input and output functions cannot be performed simultaneously through the same port. For example, data input to a first port 11a should be output through second, third and fourth ports 12b, 12c and 12d. That is, data transmission cannot be performed through a crossing point between the input port 11 and the output port 12 formed by the same port in FIG. 1.

Data input through the input ports 11 may temporarily be stored in buffers 13 assigned to the output ports. The buffer 13 operates in a first in first out (FIFO) manner. For example, the data transmitted from a plurality of input ports 11 is sequentially output through the output ports 12. The data output through the output port 12, i.e., the data input through the input ports 11 could be simultaneously input to the buffer 13. The buffers may be provided at each input port 11 or at the crossing point between the input ports 11 and the output ports 12.

The related art router or switching hub regards data relating to a request for a QoS as general data. For this reason, if data relating to a request for the QoS to a port whose bandwidth has been exceeded is input, the related art router or switching hub discards the data and the QoS is not provided. For example, when AV streams are processed through specific ports, if file transmission is performed through the same port, the AV streams may be disconnected due to the contention.

Figure 2:
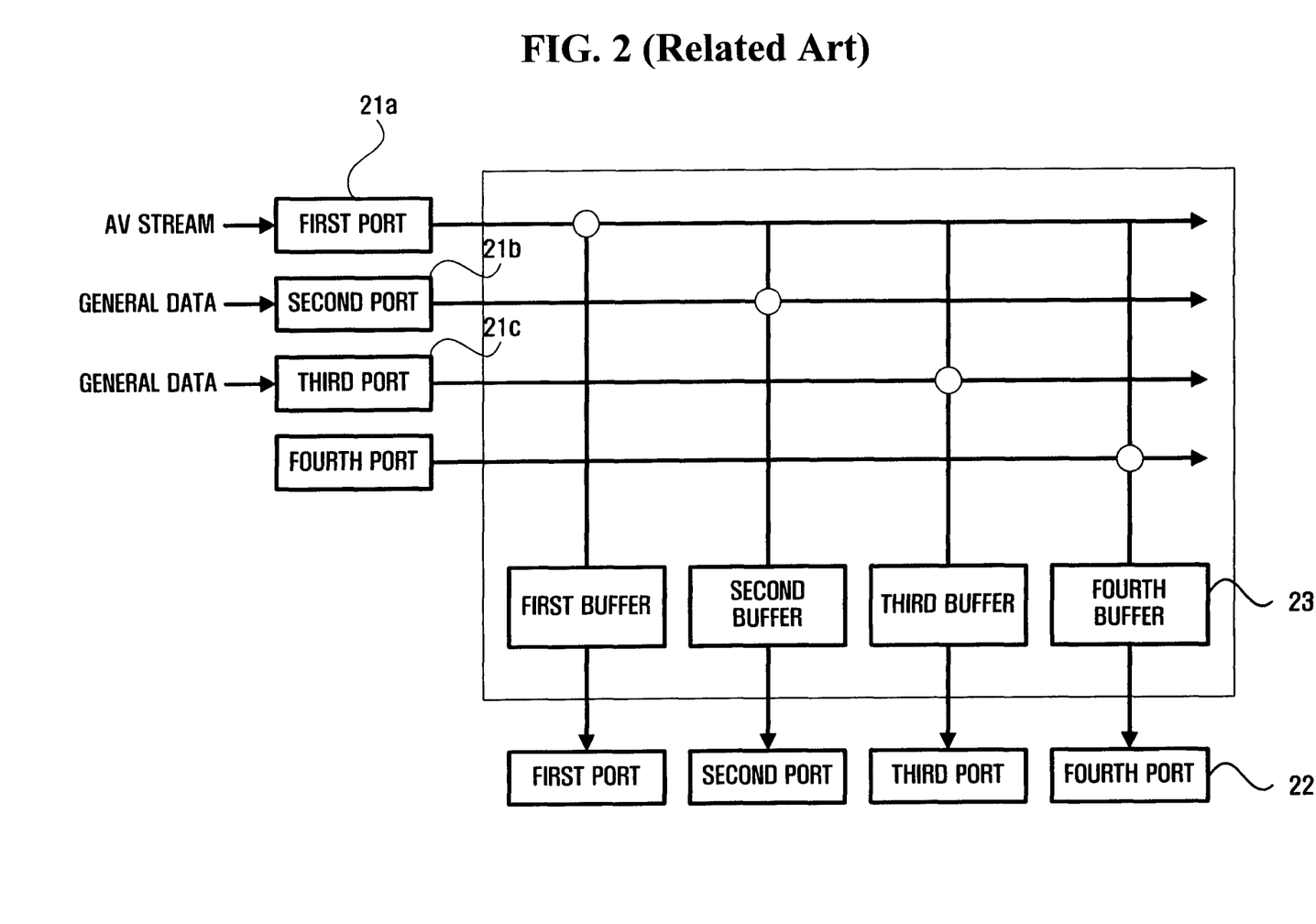
FIG. 2 is a conceptual view showing how traffic is processed by a related art hub.

FIG. 2 is a conceptual view showing how traffic is processed by a related art hub. Referring to FIG. 2, AV streams are input through a first input port 21a, and the input data is output through a fourth output port 22.

At this time, general data is input to a second input port 21b and a third input port 21c, and the input data is output through the fourth output port 22. In this case, if the capacity of a buffer 23 of the fourth output port 22 is exceeded, the data from each input port competes with one another in the fourth output port 22. Thus, some of the AV streams may not be output. Also, most of the general data occupies the maximum bandwidth during data transmission because of best effort characteristics. Therefore, the AV streams transmitted at uniform bandwidths may be damaged by the general data.

In case of general data, some of data that is not output may be processed through retransmission. However, in case of AV streams, data that is not processed cannot be processed again due to a time limit. If traffic requiring a QoS, such as AV streams, is generated, a router that provides the QoS is required.

US Patent Publication Number 2003-0007724 discloses a system and method for processing data input to a buffer of an optical node provided between a hub and a user using a time division multiple access (TDMA) mode to provide input and output functions of a video file. However, this publication fails to disclose the processing of a plurality of input data.

SUMMARY OF THE INVENTION

Accordingly, the present invention has been made to solve the above-mentioned problems occurring in the related art. The present invention provides an apparatus and method for providing a QoS of AV streams, in which a period for processing AV streams is assigned at a predetermined time for processing data to provide the QoS for AV streams.

Further, the present invention provides an apparatus and method for providing a QoS of AV stream, in which data is processed using a switching hub to simultaneously process a plurality of AV streams and general data.

Additional aspects and features of the invention will be set forth in part in the description which follows and in part will become apparent to those having ordinary skill in the art upon examination of the following or may be learned from practice of the invention.

According to the invention, there is provided an apparatus for providing a QoS for AV streams, which comprises a determination unit identifying a type of input data, a TDMA scheduler assigning time division periods for processing the AV streams and general data during a predetermined recurring time period in accordance with the result of identification, a buffer storing the AV streams and the general data in memory areas corresponding to the assigned time division periods, and an output port extracting and outputting the AV streams and the general data stored in the buffer in a FIFO manner.

In another aspect of the present invention, there is provided a method for providing a QoS for AV streams comprising identifying a type of input data, assigning time division periods for processing the AV streams and general data during a predetermined recurring time period in accordance with the result of identification, storing the AV streams and the general data in memory areas corresponding to the assigned time division periods, and extracting and outputting the stored AV streams and the general data in a FIFO manner.

BRIEF DESCRIPTION OF THE DRAWINGS

The above and other aspects and advantages of the present invention will become more apparent from the following detailed description taken in conjunction with the accompanying drawings, in which.

DETAILED DESCRIPTION OF EXEMPLARY EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 3:
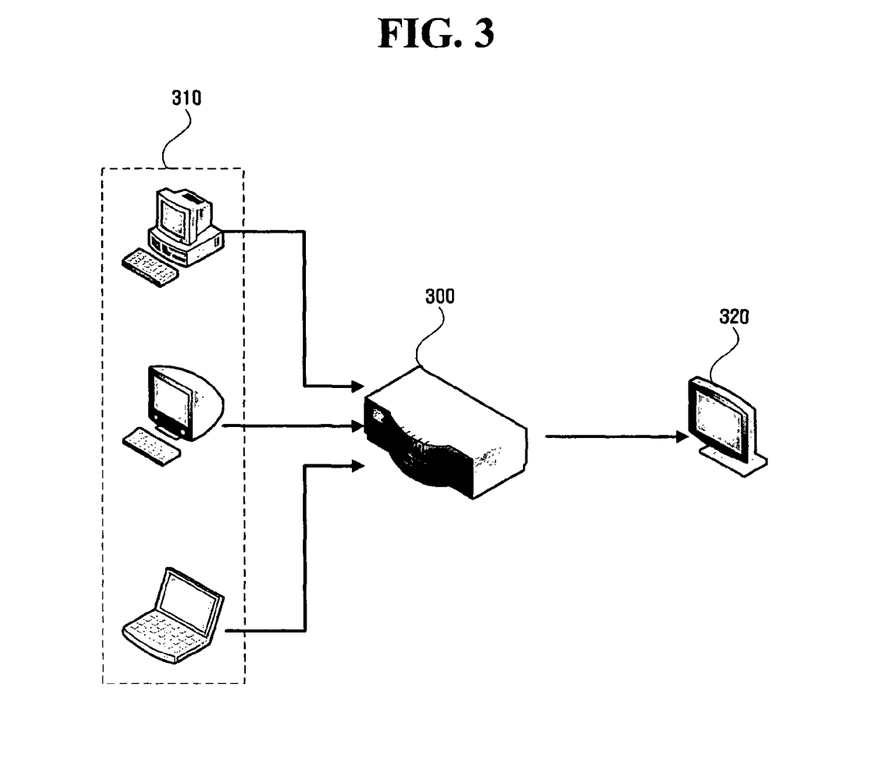
FIG. 3 is a view illustrating a system for providing a QoS of AV streams according to an exemplary embodiment of the present invention.

FIG. 3 is a view illustrating a system for providing a QoS of AV streams according to an exemplary embodiment of the present invention. Referring to FIG. 3, the system includes a data generator 310, a switching hub 300, and a data processor 320.

The data generator 310 generates AV streams or general data. The generated data is transmitted to the data processor 320 through the switching hub 300.

The AV streams comprise data including at least one of audio and moving pictures. The general data is data other than the AV streams. The general data is retransmitted through acknowledgement if it is not received by the data processor. However, the AV streams are not retransmitted through acknowledgement if they are not received by the data processor. Therefore, if the AV streams are not successfully transmitted, they are discarded. As a result, the AV streams may not be received occasionally or they may include mosaic images in the data processor 320.

The data generator 310 identifies the AV streams and the general data using an identifier of an Ethernet header of the AV stream data. Therefore, the data generator 310 may be provided with a means for providing a predetermined identifier to a header of the AV streams. The data generator 310 may use software or hardware to produce the identifier. For minimal upgrading of the existing data generator, the data generator 310 preferably uses software to provide the identifier.

The switching hub 300 provides the QoS of the AV streams according to an exemplary embodiment of the present invention. The switching hub 300 serves to transmit the data received from the data generator 310 to the data processor 320. In other words, the switching hub 300 serves as a relay between the data generator 310 and the data processor 320. Since the switching hub 300 is provided with a buffer therein to process the received data, it simultaneously receives the data from a plurality of the data generators and transmits it to the data processor.

The buffers may be provided to correspond to each output port. Also, the buffers may be provided to correspond to input ports or a crossing points between output ports and input ports as the case may be.

The data is input and output through ports provided in the switching hub 300. As described above, since each port performs one of input and output functions, a port that performs an input function may not perform an output function.

The switching hub 300 of the present invention identifies the type of the data to be received before receiving the data from the data generator 310, i.e., when setting access. At this time, if the type of the data is an AV stream, the switching hub 300 assigns a memory area of the buffer. To inform the receiving party of the data type, the data generator 310 may transmit a predetermined frame indicating the type of the data to be transmitted.

The memory area of the buffer is assigned by the time division multiple access mode. The time division multiple access mode sets a predetermined recurring time, divides the set recurring time into several periods, and transmits the data each period depending on the data type. For example, if the recurring time is divided into ten periods and three periods correspond to the AV streams, the general data is not processed but the AV streams are processed for three periods so that the processed AV streams are transmitted to the data processor 320.

Therefore, the switching hub 300 ensures output of the AV streams received for the time assigned to the AV streams per recurring time in order to avoid degradation of the AV streams. The period for processing the AV streams for the recurring time is determined by the number of data generators 310 that are intended to transmit the AV streams among the data generators 310 connected to the switching hub 300. A ratio of the period may be varied dynamically when the data is processed for the recurring time. For example, if an AV stream transmission request is received from another data processor 310 during the three periods of the recurring time reserved for transmission of the AV streams, the periods assigned for transmitting the AV streams can be increased to four periods.

The buffer has a structure like a queue. The buffer processes the input data in a FIFO manner. Therefore, the output port transmits the data transmitted from the buffer to the data processor. If the data input to the buffer exceeds the capacity of the buffer, some data may be discarded. If the AV streams are discarded, degradation of the AV streams may occur. Therefore, it is preferable that the period assigned to process the AV streams has a size sufficient to process all the input data. Preferably, the period does not exceed 80% of the recurring time in accordance with traffic distribution of the time division multiple access mode of the IEEE 1394 standard.

Meanwhile, if no AV streams are input, the recurring time period can be used to process the general data.

Since the data processor 320 processes the data received from the switching hub 300, a PC, server, or display device may be used as the data processor.

For reference, since each port of the switching hub 300 can perform input and output functions, all the hosts 310 and 320 connected to each port can act as the data generator 310 and the data processor 320. Therefore, the data generator 310 and the data processor 320 shown in FIG. 3 are functionally divided. It should be noted that the data generator 310 can perform the function of the data processor 320 and vice versa.

Figure 4:
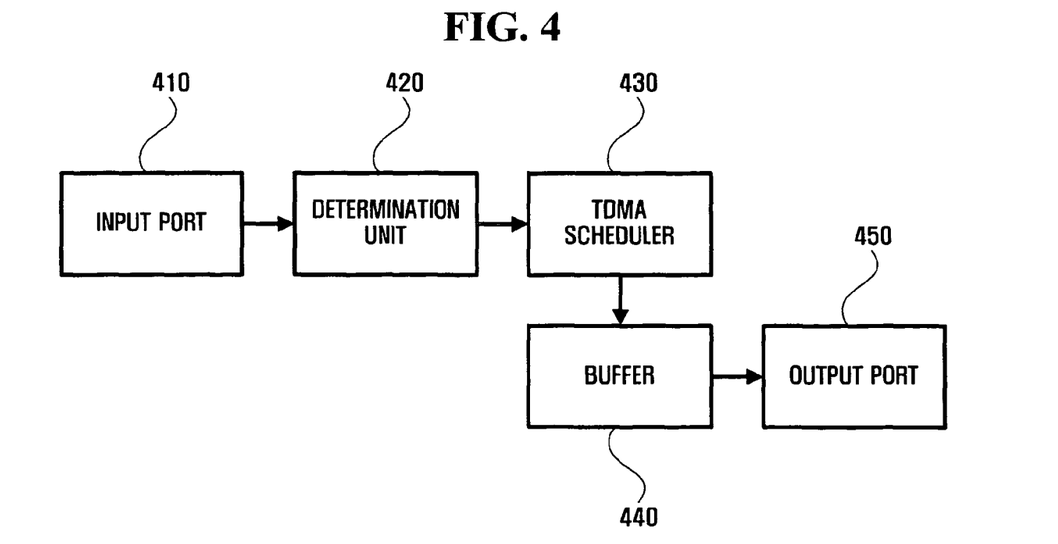
FIG. 4 is a block diagram illustrating the construction of an apparatus for providing a QoS of AV streams according to an exemplary embodiment of the present invention.

FIG. 4 is a block diagram illustrating the construction of an apparatus for providing the QoS of AV streams according to an exemplary embodiment of the present invention. Referring to FIG. 4, the apparatus includes an input port 410, a determination unit 420, a TDMA scheduler 430, a buffer 440, and an output port 450.

The input port 410 serves to receive at least one of the AV streams and general data from the data generator 310. Also, the input port 410 may receive a frame, which identifies the type of data to be received from the data generator 310, while setting access with the data generator 310. At this time, a cable communication mode, such as Ethernet, USB, IEEE 1394, serial communication or parallel communication may be used as the communication mode between the input port 410 and the data generator 310. Also, a wireless communication mode such as infrared, Bluetooth, home RF and wireless LAN can be used. Preferably, Ethernet cable communication is used as the communication mode.

The received AV streams, the general data, or the frame that identifies the type of the data is transmitted to the determination unit 420.

The determination unit 420 serves to identify the type of the data transmitted from the input port 410. In other words, the determination unit 420 identifies whether the data transmitted from the input port 410 is an AV stream or general data. At this time, the data is identified using a predetermined identifier included in a data header.

For example, the data area of the Ethernet frame is an IP datagram, and the type field is set to 0×800. In the present invention, if the type of the data is an AV stream, the type field is set to a random value such as 0×8FF, which means "not reserved". To this end, the data generator 310 may be provided with a means for setting the type field to a predetermined value before transmitting the AV streams.

Furthermore, the determination unit 420 serves to identify that the input port 410 will receive the type of data from the data generator 310. That is, the determination unit 420 identifies the type of the data to be received using a frame while the input port 410 gives the data generator 310 access. To this end, the data generator 310 may be provided with a means for transmitting a frame that identifies the type of the data before transmitting the data.

The identified data or the frame is transmitted to the TDMA scheduler 430.

The TDMA scheduler 430 serves to assign a time division period for processing the AV streams and the general data during a predetermined recurring time to the data transmitted from the determination unit 420.

The recurring time means the time for processing the AV streams and the general data received from one or more data generators 310 in a serial manner. The recurring time depends on user settings and the supported communication bandwidth.

The recurring time includes an isochronous period and an asynchronous period. The AV streams are processed in the isochronous period and the general data is processed in the asynchronous period. The recurring time will be described later in detail with reference to FIG. 5.

The TDMA scheduler 430 can dynamically control a ratio of the time division period depending on the input AV streams and general data. For example, the TDMA scheduler 430 increases the ratio of the time division period for the AV streams if the data generator 310 for transmission of the AV streams is additionally provided while the data is processed depending on a previously set ratio of the time division period. Further, the TDMA scheduler 430 decreases the ratio of the time division period for the AV streams if the data generator 310 for transmission of the AV streams stops transmission of the AV streams. In other words, the ratio of the time division period for the AV streams is determined by the number of data generators 310 for transmission of the AV streams. Preferably, the ratio of the time division period for the AV streams is set so as not to exceed 80% of the recurring time in accordance with traffic distribution of the time division multiple access mode of the IEEE 1394 standard.

To assign the time division period for the AV streams during the recurring time, the TDMA scheduler 430 uses the frame for identifying the type of the data to be received, which is transmitted from the determination unit 420. In other words, if the type of the data to be received, which is identified while the input port 410 gives the data generator 310 access, corresponds to the AV streams, the TDMA scheduler 430 assigns the time division period for the AV streams.

As a result, the AV streams are isochronously processed in the time division period for the AV streams and the general data is asynchronously processed in the other time division period.

The buffer 440 temporarily stores the AV streams and the general data to be processed in the time division period assigned by the TDMA scheduler 430. The buffer 440 has a structure like a queue. The buffer processes the input data in a FIFO manner.

The data may be stored in the buffer 440 to correspond to the time division period of the recurring time. For example, it is supposed that the time division period for the AV streams corresponding to the isochronous period is divided into three periods and the time division period for the general data corresponding to the asynchronous period is divided into seven periods. In this case, the AV streams are temporarily stored in 30% of the buffer. Since the ratio of the time division period for the AV streams is determined by the data generator, the AV streams are all processed and output.

The data of the buffer 440 is extracted in a FIFO manner and transmitted to the output port 450. The output port 450 transmits the received data to the data processor 320.

Figure 5:
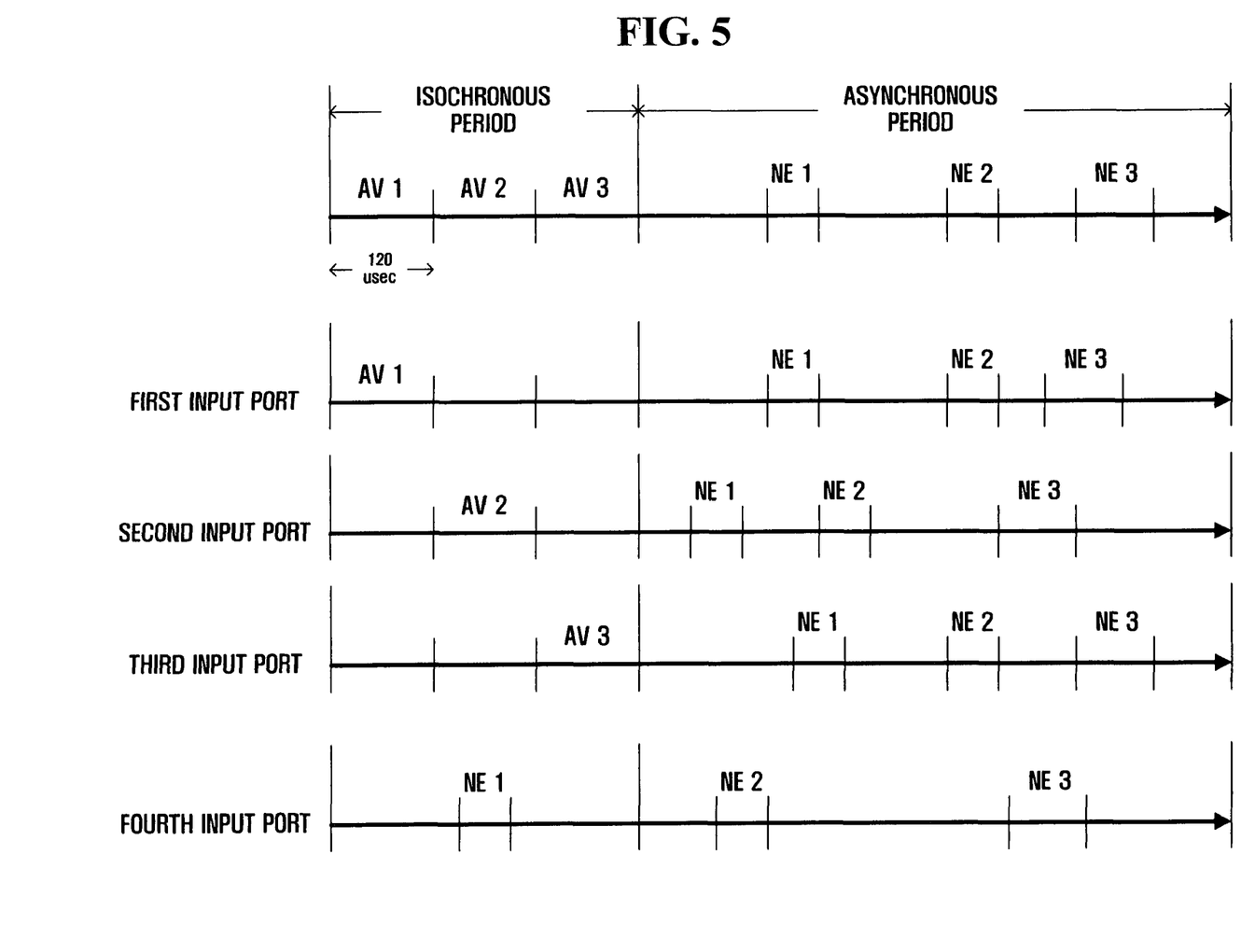
FIG. 5 illustrates a recurring time according to an exemplary embodiment of the present invention.

FIG. 5 illustrates a recurring time according to an exemplary embodiment of the present invention. As described above, the recurring time includes an isochronous period and an asynchronous period. The AV streams are processed in the isochronous period while the general data is processed in the asynchronous period.

The recurring time means unit output time of serial data output through one output port. The recurring time is determined by the supported communication bandwidth, i.e., it is determined by the data transmission rate of the wire and the size of the protocol data unit. For example, if the communication bandwidth is 100 Mbps, corresponding to 12.5 MB/sec, the time required for transmission of one 1500 Byte frame is 120 μsec:

1 frame time=1500/12500000=120 μsec

Therefore, the recurring time (ten periods) is 1200 μsec. That is, one frame, which is processed in one period, is transmitted.

The AV streams are transmitted at the maximum frame size to enhance the transmission efficiency. At this time, since the frame has a size of 1500 Bytes in Ethernet, the size of the frame is set as the size of the time division period for the AV streams in the present invention.

Since the frame for the general data may have different sizes, the asynchronous period is used to transmit the general data.

In FIG. 5, three periods among ten periods are set for the AV streams while the other seven periods are set for the general data. Since the periods for the AV streams are the isochronous periods, one frame is processed in each period. Since the periods for the general data are the asynchronous periods, the data is processed depending on the data input time and order.

Even in case where the AV streams are simultaneously input from three input ports as in FIG. 5, the respective AV streams are stored in the buffer so that they are processed in the previously set isochronous periods. As a result, the AV streams are all processed.

Furthermore, the general data may be input in the isochronous periods. In this case, the general data is stored in an area of the buffer for the general data, and is then processed.

Meanwhile, the general data is processed in the asynchronous periods. Unlike the isochronous periods in which the data is processed at a specific time, the data is processed in the asynchronous periods depending on the input time and order.

Figure 6:
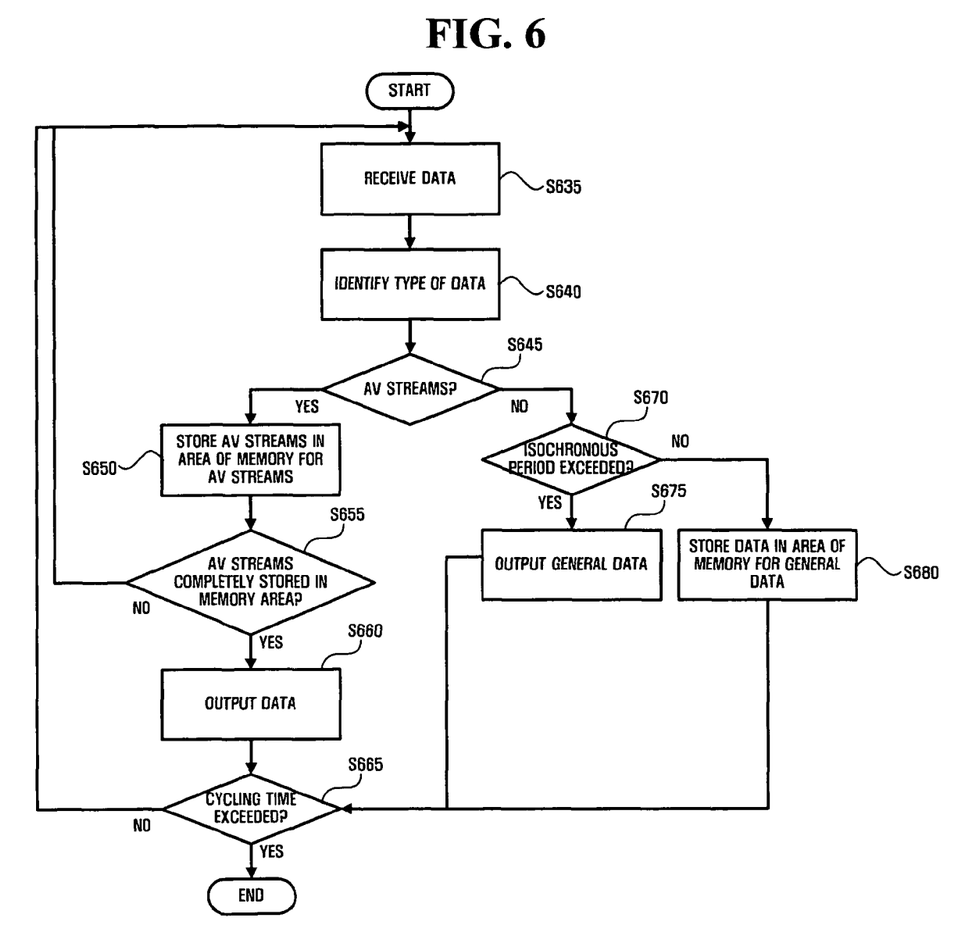
FIG. 6 is a flowchart illustrating a process of providing a QoS of AV streams according to an exemplary embodiment of the present invention.

FIG. 6 is a flowchart illustrating a process of providing a QoS of AV streams according to an exemplary embodiment of the present invention.

The input port 410 of the switching hub 300 sets access with the data generator 310 so that the switching hub 300 provides the QoS of the AV streams. In this case, the input port 410 may receive the frame for identifying the type of the data to be received from the data generator 310. The received frame is transmitted to the determination unit 420. The determination unit 420 identifies the type of the data to be received by referring to the received frame, and transmits the result to the TDMA scheduler 430.

Then, the TDMA scheduler 430 assigns the time division periods of the recurring time depending on the result. In other words, the TDMA scheduler 430 assigns the isochronous periods if the data to be received is the AV streams, and it takes no action if the data to be received is general data. Thus, a memory area is assigned to the buffer 440. For example, if there are three data generators 310 that transmit the AV streams, three memory areas for the AV streams are assigned to the buffer 440.

The size of each memory area assigned to the buffer 440 corresponds to the size of the data processed in one isochronous period of the recurring time; since this size is one frame, it may be 1500 Bytes. However, the size of each memory area assigned to the buffer 440 may be set variably and dynamically depending on the type of the AV streams received from the data generator 310.

After the recurring time and the memory areas are completely assigned to the buffer, if the input port 410 receives the data from the data generator 310 S635, the determination unit 420 identifies the type of the received data S640 and S645.

The type of the received data can be identified through the content of a predetermined field included in the data header. For example, if a previously set value such as 0×800 is input to the type field of the header, the received data is identified as AV streams. If a previously set value such as 0×8FF is input to the type field of the header, the received data is identified as general data.

The TDMA scheduler 430 stores the received data in the buffer 440 depending on the result from the determination unit 420. In other words, if the received data is AV streams, the TDMA scheduler 430 stores the received data in the previously assigned area of the buffer 440 for the AV streams S650. If the received data is general data, the TDMA scheduler 430 stores the received data in another area of the buffer 440 S680. At this time, the TDMA scheduler 430 identifies whether the time corresponding to the isochronous period during the recurring time has passed S670. If so, the TDMA scheduler 430 outputs the received general data S675. If not, the TDMA scheduler 430 stores the received data in the buffer S680.

The buffer 440 has a structure like a queue. If the data input to the buffer exceeds the capacity of the buffer, additional data cannot be stored in the buffer. Generally, the buffer processes the input data in a FIFO manner. Therefore, the output port 450 transmits the data transmitted from the buffer 440 to the data processor 320 S660 and S675.

At this time, the data may be input through a plurality of the input ports. That is, a plurality of data may be input in the first period of the plurality of isochronous periods. Thus, the input data is sequentially output after the other isochronous periods lapse.

If the AV streams are stored in the buffer 440, the TDMA scheduler 430 identifies whether the AV streams are stored in the memory area previously assigned for the AV streams S655. If the AV streams are not completely stored in the memory area previously assigned for the AV streams, the TDMA scheduler 430 receives the data through the input port 410. If the AV streams are all stored in the memory area previously assigned for the AV streams, the TDMA scheduler 430 sequentially extracts the AV streams stored in the buffer 440, and outputs them through the output port 450 using a best effort mode that processes the general data in a manner that depends on free competition S660.

Finally, the TDMA scheduler 430 determines whether the recurring time has passed S655 in order to process the data in the isochronous and asynchronous periods.

Preferably, the front portion of the buffer 440 is set as a memory area for the AV streams, and the rear portion is set as a memory area for the general data. This is to first process the AV streams so as to prevent degradation of the AV streams from occurring.

As described above, the apparatus and method for providing the QoS of AV streams have the following advantages.

First, since the period for processing the AV streams is assigned at a predetermined time, it is possible to provide the QoS of the AV streams.

Second, since the data is processed using the switching hub, it is possible to simultaneously process general data and a plurality of AV streams.

Finally, since the QoS for the AV streams can be provided through modifying only the switching hub, it is possible to use the existing apparatus.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for providing a Quality of Service (QoS) of Audio-Visual (AV) streams, the apparatus comprising:
   a determination unit that identifies types of data including AV streams and general data;
   a time division multiple access (TDMA) scheduler that assigns time division periods for processing the AV streams and the general data during a predetermined recurring time period in accordance with an identification result from the determination unit;
   an input port that receives the data including the AV streams and the general data;
   a buffer that stores the AV streams and the general data in memory areas respectively corresponding to the assigned time division periods; and
   an output port that extracts and outputs the AV streams and the general data stored in the buffer,
   wherein sizes of the memory areas of the buffer are dynamically varied to correspond to respective time division periods in the recurring time period,
   wherein the determination unit identifies the types of the data before the input port receives the data, and
   wherein the assigned time division periods include a plurality of isochronous periods for processing the AV streams and a plurality of asynchronous periods for processing the general data.

2. The apparatus as claimed in claim 1, wherein the AV streams and the general data are output in a First In, First Out (FIFO) sequence.

3. The apparatus as claimed in claim 1, wherein the AV streams are data including at least one of audio and moving pictures.

4. The apparatus as claimed in claim 1, wherein the TDMA scheduler dynamically controls a ratio of the time division periods in accordance with the AV streams and the general data.

5. The apparatus as claimed in claim 4, wherein the TDMA scheduler assigns the time division period for processing the AV streams to be about 80% or less of the recurring time period.

6. The apparatus as claimed in claim 4, wherein the TDMA scheduler controls the size of the recurring time period in accordance with the supported communication bandwidth.

7. The apparatus of claim 1, wherein a memory area from the memory areas occupies a percentage of the buffer which corresponds to a percentage of time occupied by a corresponding time division period in the recurring time period.

8. A method for providing a Quality of Service (QoS) of Audio-Visual (AV) streams, the method comprising:
   identifying types of data including AV streams and general data;
   assigning time division periods for processing the AV streams and the general data during a predetermined recurring time period in accordance with an identification result;
   receiving the data including the AV streams and the general data;
   storing the AV streams and the general data in memory areas corresponding to the assigned time division periods; and
   extracting and outputting the stored AV streams and general data,
   wherein sizes of the memory areas are dynamically varied to correspond to respective time division periods in the recurring time period,
   wherein the types of the data are identified before the receiving of the data, and
   wherein the assigned time division periods include a plurality of isochronous periods for processing the AV streams and a plurality of asynchronous periods for processing the general data.

9. The method as claimed in claim 8, wherein the AV streams are data including at least one of audio and moving pictures.

10. The method as claimed in claim 8, wherein assigning of the time division periods includes dynamically controlling a ratio of the time division periods in accordance with the AV streams and the general data.

11. The method as claimed in claim 10, wherein assigning of the time division periods includes assigning the time division periods for processing the AV streams to be about 80% or less of the recurring time period.

12. The method as claimed in claim 10, wherein assigning of the time division periods includes controlling a size of the recurring time period in accordance with a supported communication bandwidth.

13. The method as claimed in claim 8, wherein the AV streams and the general data are output in a First In, First Out (FIFO) sequence.

14. The method of claim 8, wherein the memory areas, length of the recurring time period, and a number of the time division periods and a duration of each period of the time division periods within the recurring time period, are set based on the determined types of the data.

15. The method of claim 8, wherein a number of time division periods and a duration of each period of the time division periods within the recurring time period and the size of corresponding memory areas are dynamically adjusted.

* * * * *